United States Patent [19]

Douglas

[11] 4,205,216
[45] May 27, 1980

[54] LASER WELDING SYSTEM AND METHOD

[75] Inventor: Robert R. Douglas, Omaha, Nebr.

[73] Assignee: Western Electric Company, Inc., New York, N.Y.

[21] Appl. No.: 945,963

[22] Filed: Sep. 26, 1978

[51] Int. Cl.$^2$ .............................................. B23K 26/00
[52] U.S. Cl. ................................ 219/121 L; 198/803; 198/950; 219/121 LM
[58] Field of Search .... 219/121 L, 121 LM, 10.55 A, 219/159; 346/76 L; 356/244, 318; 406/65; 198/803, 343, 950

[56] References Cited

U.S. PATENT DOCUMENTS

| | | | |
|---|---|---|---|
| 925,605 | 6/1909 | Solliday | 198/950 X |
| 2,715,246 | 8/1955 | Van Doorn | 406/65 |
| 3,463,594 | 8/1969 | Myer | 219/121 L X |
| 3,530,573 | 9/1970 | Helgeland | 219/121 LM |
| 3,855,445 | 12/1974 | Jungle | 219/121 EB |
| 4,039,796 | 8/1977 | Leibin et al. | 219/10.55 A |
| 4,093,843 | 6/1978 | Lindstrom et al. | 219/121 EB |
| 4,110,594 | 8/1978 | May | 219/121 LM |
| 4,143,660 | 3/1979 | Malyshev et al. | 219/121 LM X |
| 4,162,391 | 7/1979 | Sciaky | 219/121 EB |

FOREIGN PATENT DOCUMENTS

| | | | |
|---|---|---|---|
| 2629751 | 5/1978 | Fed. Rep. of Germany | 219/121 EB |
| 586425 | 3/1947 | United Kingdom | 219/121 L |

OTHER PUBLICATIONS

(S60650201), Aeschlimann et al., "Automated Welding of Minute Parts", *Laser Focus*, vol. 12, No. 3, pp. 33-36, Mar., 1976.

*Primary Examiner*—Laramie E. Askin
*Assistant Examiner*—E. F. Borchelt
*Attorney, Agent, or Firm*—Robert B. Kennedy

[57] ABSTRACT

A laser welding system is disclosed having a housing formed with an opening through which workpieces may be passed, and a laser for generating and directing a laser beam into a welding station within the housing. The system further includes a light trap for inhibiting light from passing from the welding station through the housing opening to the exterior to the housing and a conveyor for conveying workpieces between workpieces loading and unloading stations located exteriorly of the housing and the welding station through the housing opening and the light trap.

A method of laser welding a succession of workpieces is also disclosed comprising the steps of successively loading workpieces onto a conveyor at a loading station and conveying the workpieces through a light trap to a welding station located within a housing. The workpieces are illuminated with laser radiation at the welding station and then conveyed through a light trap out of the housing to an unloading station where they are unloaded.

16 Claims, 4 Drawing Figures

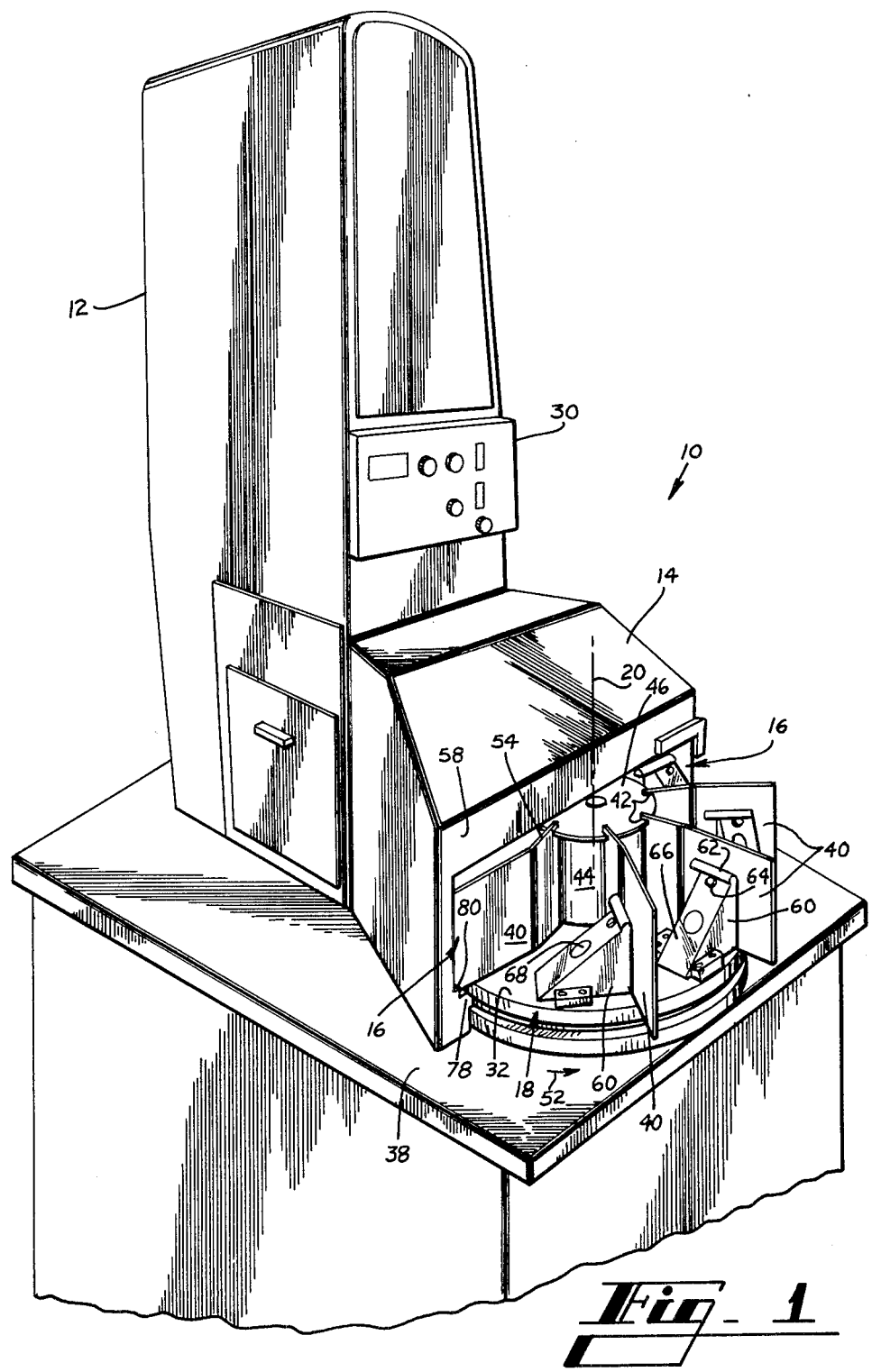
Fig_1

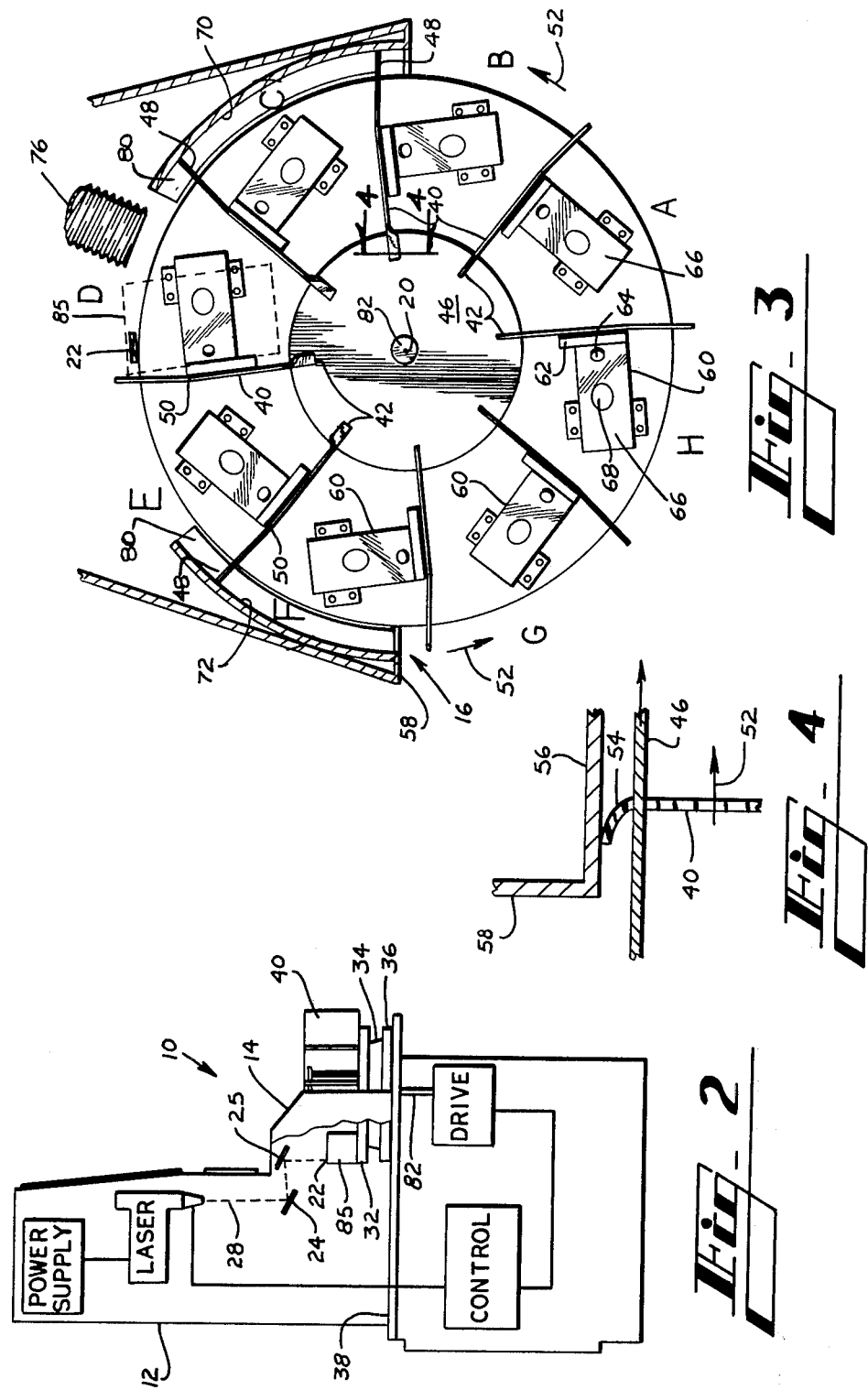

LASER WELDING SYSTEM AND METHOD

Technical Field

This invention relates to welding systems of the type using laser radiation as a heat source.

Background of the Invention

Heretofore lasers have been used as a source of radiant energy for performing welding operations. Their use offers a distinct advantage over conventional electric type welders by eliminating the need for contact by the welding apparatus with the workpiece. This is quite important in the electronics industry where relatively small mechanical distortions can be easily created by direct contact with a welding tool such as an electrode. Their use also reduces the need for complex linkages such as those required on resistance type welders and simplifies fixturing. The critical tolerances normally required with resistance welding on parts location, fixturing, grounding, electrode position, pressure and dress are also substantially reduced with laser welding systems.

For the numerous advantages provided by laser welding there has remained one distinct disadvantage in their usage. With conventional welding operations, particularly those associated with small workpieces, an operator may normally insure his personnel safety from the heat generated in forming the welds by merely insuring that he remains at a safe distance from the weld site. In the case of laser welding, however, this is not true. Normally light, such as that emitted omnidirectionally from an incandescent lamp, decreases in power and luminescence by the square of the distance from the light source. A principle characteristic of lasers however is that the emitted beam does not diverge. Therefore, with laser beams the power of the beam remains virtually constant over substantial distances of beam travel from the laser light source. Accordingly, the danger presented of an operator being biologically harmed by contact with the beam, either directly or from reflection from the workpiece, and in some cases even from scattered radiation, cannot be safely reduced by merely locating the operator at a distance away from the weld site.

In view of the just described danger, government regulators have adopted and imposed safety requirement on the use of laser welding systems in industry. These regulations establish safety criterions that are predicated on the degree of safety offered by particular classes of laser welders. For example, with those laser welders designed to prohibit any light from being emitted from the welder during operation no special safety equipment or handling operations are imposed. On the other hand where high power laser radiation may be emitted freely from the weld site certain protective clothing, goggles and the like must be worn by the operators. Since the wearing of such protective garments can easily reduce the efficiency of the operator it has become quite desirable to manufacture laser welders which meet the most strengent of safety requirements by not emitting substantial laser radiation from the welder or welding system.

One manner in which the just described problem has heretofore been solved has been through the use of a light shroud placed over the welder during each operation. The shroud serves to inhibit light from being emitted from the laser system during welding operations. With this approach however the shroud must be raised and lowered for each welding operation which in turn presents a substantial limitation on welding efficiency where a succession of workpieces is to be welded.

U.S. Pat. No. 3,463,594 desribes another system of the prior art concerned with this problem as it relates to microscopes. Here, a rotatable shield is positioned about a beam splitting mirror to inhibit one from viewing a sample or workpiece simultaneously with the direction of laser energy from a laser onto the beam splitting mirror and the workpiece. In such a study situation however no problem of efficiency is prevented as in the case of industrial welding operations where workpieces must be successively handled in an expedious manner.

Accordingly, it is a general object of the present invention to provide an improved laser welding system.

Another general object of the invention is to provide an improved method of laser welding a succession of workpieces in a safe but efficient manner.

More specifically, it is an object of the invention to provide a laser welding system from which substantial radiation is not emitted to the system environs during welding operations.

Another object of the invention is to provide a laser welding system of the type described into which workpieces may be manually fed in succession without subjecting the operator to laser radiation.

Yet another object of the invention is to provide a laser welding system of the type described into which workpieces may be loaded, welded and unloaded in an efficient and safe manner.

Summary of the Invention

In one form of the invention a laser welding system is provided which comprises a housing having an opening through which workpieces may be passed, and means for generating and directing a laser beam into a welding station within the housing. Light trap means are providing for inhibiting light from passing from the welding station through the housing opening to the exterior of the housing. Conveyor means are also providing for conveying workpieces between workpiece loading and unloading stations located exteriorly of the housing and the welding station through the housing opening and the light trap means.

In another form of the invention a laser welding system is provided which comprises a housing having an opening through which workpieces may be passed, and means for generating and directing a laser beam into a welding station within the housing. A turntable is mounted for rotary movement about an axis along a circuitous path extending from a workpiece loading station located exteriorly of the housing, through the housing opening to the welding station, and back through the housing opening to a workpiece unloading station located exteriorly of the housing. Light baffle means are provided for inhibiting light from passing from the welding station through the housing opening and to the workpiece loading and unloading stations.

In yet another preferred form of the invention a method of laser welding a succession of workpieces is provided which comprises the steps of successively loading workpieces onto a conveyor at a loading station and conveying the workpieces from the loading station through a light trap to a welding station within a housing. The workpieces are illuminated with laser radiation at the welding station and then conveyed through a light trap out of the housing to an unloaded station where they are unloaded.

Brief Description of the Drawings

FIG. 1 is a perspective view of a laser welding system embodying principles of the invention in one preferred form which may be used in practicing a method of the invention.

FIG. 2 is a side elevational view of the laser welding system illustrated in FIG. 1 overlayed with a block diagram of selected functional components.

FIG. 3 is a plan view of the turntable component of the laser welding system shown in FIGS. 1 and 2.

FIG. 4 is a side view, in cross-section, of a portion of one light baffle mounted atop the turntable illustrated in FIG. 3.

Description of the Preferred Embodiments

Referring now in more detail to the drawing there is shown a laser welding system 10 having an upright tower housing section 12 from a lower portion of which a material handling housing secton 14 laterally communicates. The housing section 14 is seen to be provided with a front opening 16 through which a turntable 18 is mounted for rotary movement about a turntable axis 20.

Within the housing tower section 12 is mounted a laser possessing sufficient power to affect a welding operation such as a Raytheon Model SS-480 pulsed Nd:YAG laser. The beam emitted by the laser is directed into a welding area 22 over turntable 18 by an optical system that includes a pair of mirrors 24 and 25 located along a beam path 28. If desired, a second laser and optical system may be used for scanning and detection purposes in precisely locating the position of the workpiece portions to be welded. One such system is that disclosed in commonly assigned, copending patent application titled laser welding filed by J. M. Palmquist as Ser. No. 809,212 on June 23, 1977.

A conventional power supply is also mounted within the housing tower section 12 for powering the laser while a conventional cam drive is mounted within the lower housing section for rotating with drive shaft 82 the turntable 18 in incremental steps. The intermittant operation of the laser and the turntable drive are synchronized by a control system having its own power supply as shown schematically in FIG. 2. The control system may be set by the manual positioning of controls upon the control panel 30.

With continued reference to the drawing the turntable 18, which may be provided by a modified type dial sold by the Precision Detroit Corporation of Detroit, Michigan, is seen to include a rotatable discshape turntable top or dial 32 mounted to the drive shaft 82 above an annular, stationary base having a conically shaped upper portion 34 projecting upwardly from a disc-shaped lower portion 36 mounted upon a housing shelf 38. This shelf is located at a height to enable operators to manually load and unload workpieces upon the turntable with facility.

A set of eight light baffles 40 is seen to be mounted uprightly atop the turntable top 32 generally radially the turntable axis 20. The lower edge of each baffle is seated snuggly against the upper surface of the turntable top while the upright side edge portion 42 of each baffle proximal axis 20 is seen to pass into a hollow, cylindrical hub 44 which projects upwardly from the turntable top 32. The baffles are formed of sheet metal which extend radially to the periphery of the turntable top 32 and upwardly to a disc-shaped turntable cover 46 that encloses the top of hub 44. The sheet metal component of the baffles are overlayed with rubber coverings that extend somewhat beyond the periphery of the turntable top 32 and above the turntable cover 46 to form flexible baffle end portions 48 and 54. Each baffle is also seen to be formed with a slight bend 50 whereby the baffle portions beyond the bend distal the turntable hub slightly trail the portion of the baffle proximal the hub when the turntable is driven counterclockwise in the direction of arrows 52.

In FIG. 4 the upper end portion 54 of each light baffle is seen to project slightly above the disc-shaped turntable cover 46. With this portion of the baffle being flexible, upon its being brought into contact with a ceiling 56 that extends inwardly from the front panel member 58 of housing secton 14 it is bent rearwardly in light sealing engagement therewith. In this manner light is inhibited by the baffle upper end portion 54 from being emitted from the interior of the housing section 14 between the ceiling 56 and turntable cover 46.

Between each adjacent pair of baffles is mounted upon the turntable top 32 a fixture 60. These fixtures provide mounts upon which workpieces may be individually mounted for laser welding operations. The fixtures may take any number of shapes as dictated by that of the workpiece to be welded. In this particular case each fixture is seen to include a raised bar 62 located adjacent a pin 64 that projects upwardly slightly above an inclined fixture surface 66. A permanent magnet 68 is located along the center of the surface 66. With this configuration a workpiece having a straight edge may be readily positioned against the fixture bar 62 and then seated upon the projecting pin 64 with magnet 68 holding the fixture firmly in place.

With reference to FIG. 3 it may be seen that the lower housing section 14 includes a pair of curved stepped walls 70 and 72 which extend inwardly from opening 16 in front panel section 58. An exhuast hose 76 is mounted between these walls adjacent the welding station 22. The concave surfaces of the curved wall 70 and 72 are located so as to cause the flexible end portions 48 of the baffles to engage them as they are rotated within the housing. With this construction laser light emitted into the welding station 22 is inhibited from exiting, either directly, by reflection or from dispersion, the housing opening 16 either above the turntable top 32 or above the turntable cover 46 beneath housing ceiling 56. Furthermore, it may be seen from FIG. 1 that light is also prevented from exiting the opening from beneath the rotatable turntable 18 aside the turntable base 34 by the provision of a housing tab 78 which extends into contact with the base. Dispersed light is also inhibited from passing in any significant degree through the housing opening between the periphery of the turntable 18 itself and the ledge 80 of the housing adjacent thereto by the very close positioning of the ledge with the turntable periphery.

In operation a workpiece is manually loaded atop a fixture 60 by an operator at a load station A as shown in FIG. 3 with the turntable in a momentarily stationary position. In increments of a few seconds the system control commands the drive unit to turn drive shaft 82 thereby causing the turntable to index the fixture counterclockwise to position B. At this point the operator may again, and successively thereafter, load other workpieces onto the fixtures as they are presented next at station A. After another pause the turntable control again drives the turntable bringing loaded workpiece into station C. In this position it is seen that both of the baffles bounding the fixture are in light sealing engagement with the housing wall 70 and with the upper end portions 54 of the baffles in sealing engagement with housing ceiling 56. The next indexing of the turntable brings the loaded fixture to station D where the workpiece may assume the position 85 shown in broken outline form over the welding statin 22. At this time the system control instructs the laser to generate and emit a pulse of laser radiation along optical path 28 into the welding station 22. As this is done continuous suction being applied to the hose 76 draws fumes created by the welding operation out of the housing. Next the turntable is again indexed bringing the welded workpiece and fixture to the station E. After this the workpiece is passed to station F where again it is seen that a baffle 40 is in direct contact with the wall 72. Next the turntable is successively indexed through stations G and H, where the workpiece may be manually unloaded from the fixture, and finally back again to loading station A. If desired, the workpieces may be, of course, be loaded and unloaded at a common load and unload station.

It should thus now be apparent that an improved laser welding system is provided into which workpieces may be manually fed in succession without subjecting the system operator to laser radiation. The just described embodiments however are only illustrative of principles of the invention in preferred forms. Many modifications, additions and deletions may, of course, be made thereto without departure from the spirit and scope of the invention as set forth in the following claims.

What is claimed is:

1. A laser welding system comprising a housing having an opening through which workpieces may be passed;
   means for generating and directing a laser beam into a welding station within said housing;
   light trap means for inhibiting light from passing from said welding station through said opening to the exterior of said housing and
   conveyor means for conveying workpieces with step by step intermittent motion between workpiece loading and unloading stations located externally of said housing and said welding station through said housing opening and said light trap means whereby workpieces may be loaded and unloaded from the conveyor means at the loading and unloading stations as another workpiece is simultaneously welded at the welding station while the conveyor means is momentarily stationary.

2. A laser welding system in accordance with claim 1 wherein said conveyor means comprises a turntable and drive means for rotating said turntable about an axis.

3. A laser welding system in accordance with claim 2 wherein said turntable is mounted for rotary movement about an axis located adjacent said housing opening.

4. A laser welding system in accordance with claim 2 wherein said light trap means includes a set of mutually spaced light baffles mounted atop said turntable.

5. A laser welding system in accordance with claim 4 wherein said mutually spaced light trap baffles are mounted generally radially atop said turntable.

6. A laser welding system in accordance with claim 5 wherein said conveyor means further comprises a set of workpiece mounts secured atop said turntable with individual workpiece mounts located between adjacent members of said set of light baffles.

7. A laser welding system in accordance with claim 4 wherein said light trap means further includes a curved wall mounted within said housing adjacent said turntable, and wherein end portions of said light baffles are resilient and contact said curved wall within said housing.

8. A laser welding system in accordance with claim 1 further comprising control means for synchronizing operations of said laser beam generating and directing means with intermittent movements of workpieces by said conveyor means whereby a laser beam may be directed upon a workpiece at the welding station only while the workpiece is stationary.

9. A laser welding system comprising a housing having an opening through which workpieces may be passed;
   means for generating and directing a laser beam into a welding station within said housing;
   a turntable mounted for intermittent rotary movement about an axis along a circuitous path extending from a workpiece loading station exterior said housing through said housing opening, through said welding station, again through said housing opening and to a workpiece unloading station located exteriorly said housing; and
   means for intermittently driving said turntable;
   light baffle means for inhibiting light from passing from said welding station through said housing opening and to said workpiece loading and unloading stations whereby workpieces may be loaded and unloaded from the turntable at the loading and unloading stations as another workpiece is being welded at the welding station while the turntable is momentarily stationary.

10. A laser welding system in accordance with claim 9 wherein said light baffle means includes means for inhibiting light from passing from said welding station through said housing opening in all rotary positions of said turntable.

11. A laser welding system in accordance with claim 9 wherein said light baffle means includes a set of light baffles mounted atop said turntable extending generally radially said turntable axis.

12. A laser welding system in accordance with claim 11 wherein said turntable includes a base, a cylindrical hub extending upwardly from said base about said axis, and a disc-shaped cover mounted atop said hub, and wherein said light baffles are mounted atop said turntable base projecting generally radially outward from said turntable hub.

13. A laser welding system in accordance with claim 12 wherein said housing has a ceiling extending inwardly from above said housing opening, and wherein said turntable disc-shaped cover is positioned for rotary movement along a plane closely adjacent said housing ceiling.

14. A laser welding system in accordance with claim 13 wherein at least the upper edge portions of said light baffles are resilient; and
   wherein said turntable cover has a set of slots through which said upper edge portions of said baffles project into frictional engagement with said housing ceiling.

15. A laser welding system in accordance with claim 12 wherein the edges of said baffles distal said hub are resilient, and wherein said housing has curved walls extending inwardly from adjacent said housing opening against which said baffle resilient distal ends frictionally engage.

16. A laser welding system in accordance with claim 9 further comprising control means for synchronizing operations of said laser beam generating and directing means with intermittent movement of said turntable whereby a laser mean may be directed upon a workpiece at the welding station only while the workpiece is stationary.

* * * * *